(12) United States Patent
Harms et al.

(10) Patent No.: US 8,789,981 B2
(45) Date of Patent: Jul. 29, 2014

(54) LIGHT DIRECTING EXPANDABLE ENVELOPE

(75) Inventors: Michael R. Harms, Mendota Heights, MN (US); Lance E. Behymer, Woodbury, MN (US); Justin W. Wilhelm, St. Paul, MN (US); Lars A. Smeenk, St. Paul, MN (US); Mark H. Smith, Stillwater, MN (US); Luis A. Aguirre, Austin, TX (US); Felix Bierbaum, Hudson, WI (US); Karl K. Stensvad, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 457 days.

(21) Appl. No.: 12/895,941

(22) Filed: Oct. 1, 2010

(65) Prior Publication Data

US 2012/0081908 A1 Apr. 5, 2012

(51) Int. Cl.
*F21V 8/00* (2006.01)
*G02B 1/04* (2006.01)
*F21V 5/00* (2006.01)

(52) U.S. Cl.
CPC ............. *G02B 1/043* (2013.01); *F21V 5/005* (2013.01); *F21V 5/002* (2013.01)
USPC .......................................... 362/310; 362/19

(58) Field of Classification Search
CPC ...... G02B 1/043; A61L 31/16; A61K 31/337; F21V 1/146; F21V 1/22; F21V 3/023; F21V 3/026; F21V 5/005; F21V 5/002

USPC ................... 362/310, 19, 320, 318; 359/629
See application file for complete search history.

(56) References Cited

U.S. PATENT DOCUMENTS

| | | | |
|---|---|---|---|
| 2,646,019 | A | 7/1953 | Chetlan |
| 3,536,906 | A | 10/1970 | Bloom |
| 3,592,157 | A | 7/1971 | Schwartz |
| 3,839,631 | A | 10/1974 | Goddard |
| RE30,103 | E * | 9/1979 | Spector .......................... 362/34 |
| 4,292,999 | A | 10/1981 | Szollmann |
| 4,542,445 | A | 9/1985 | Marletta |
| 4,586,456 | A | 5/1986 | Forward |
| 4,704,934 | A | 11/1987 | Nosrati |
| 4,736,281 | A | 4/1988 | Neumeier |
| 4,794,498 | A | 12/1988 | Neumeier |
| 4,906,070 | A | 3/1990 | Cobb, Jr. |

(Continued)

FOREIGN PATENT DOCUMENTS

| | | |
|---|---|---|
| GB | 2035938 A | 6/1980 |
| JP | 61156103 | 9/1986 |

(Continued)

OTHER PUBLICATIONS

International Search Report for PCT/US2011/049355 mailed Apr. 25, 2012.

*Primary Examiner* — Sharon Payne
(74) *Attorney, Agent, or Firm* — David B. Patchett

(57) ABSTRACT

Disclosed is an expandable envelope that comprises a light directing film this both transmits and reflects light. In its inflated form and along with a light source, the envelope forms a light balloon that due to the light directing film provides directed light to an area surrounding the balloon.

16 Claims, 3 Drawing Sheets

(56) References Cited

U.S. PATENT DOCUMENTS

| | | | |
|---|---|---|---|
| 4,997,403 A | 3/1991 | Akman | |
| 5,056,892 A * | 10/1991 | Cobb, Jr. | 359/831 |
| 5,075,830 A | 12/1991 | Perez | |
| 5,083,250 A | 1/1992 | Malcolm | |
| 5,117,344 A | 5/1992 | Perez | |
| 5,119,281 A | 6/1992 | Akman | |
| 5,215,492 A | 6/1993 | Kubiatowicz | |
| 5,295,891 A | 3/1994 | Schalk | |
| 5,444,607 A | 8/1995 | Dreyfuss | |
| 5,499,941 A | 3/1996 | Penjuke, Sr. | |
| 5,795,211 A | 8/1998 | Carignan et al. | |
| 5,807,157 A | 9/1998 | Penjuke | |
| 5,857,760 A | 1/1999 | Pelton | |
| 5,893,636 A | 4/1999 | Babineaux | |
| 5,947,581 A | 9/1999 | Schrimmer et al. | |
| 6,106,135 A | 8/2000 | Zingale et al. | |
| 6,238,067 B1 | 5/2001 | Hirsch | |
| 6,305,827 B1 | 10/2001 | Nölle | |
| 6,371,638 B1 | 4/2002 | Zingale et al. | |
| 6,390,651 B2 | 5/2002 | Bertrand | |
| 6,679,614 B2 | 1/2004 | Pittman | |
| 6,769,794 B2 | 8/2004 | Huang | |
| 6,987,612 B2 | 1/2006 | Allen et al. | |
| 6,999,233 B2 | 2/2006 | Allen et al. | |
| 7,077,553 B2 | 7/2006 | Vanderschuit | |
| 7,147,536 B1 | 12/2006 | Hartelius | |
| 7,204,740 B2 | 4/2007 | Petell | |
| 7,318,765 B1 | 1/2008 | Hartelius | |
| 7,364,488 B2 | 4/2008 | Mueller et al. | |
| 7,478,779 B2 | 1/2009 | Nguyen et al. | |
| 7,503,681 B2 | 3/2009 | Kemp et al. | |
| 7,526,164 B2 | 4/2009 | Ouderkirk et al. | |
| 7,571,875 B2 | 8/2009 | Nguyen et al. | |
| 7,599,592 B2 | 10/2009 | Benson, Jr. et al. | |
| 7,611,395 B2 | 11/2009 | Bonsembiante | |
| 7,611,396 B2 | 11/2009 | Schnuckle | |
| 7,641,351 B2 * | 1/2010 | Girolami | 362/96 |
| 7,674,152 B2 | 3/2010 | Anderson | |
| 2004/0226649 A1 | 11/2004 | Van Dyke et al. | |
| 2006/0039138 A1 | 2/2006 | Oxborrow | |
| 2006/0291217 A1 | 12/2006 | Vanderschuit | |
| 2007/0167107 A1 | 7/2007 | Petell et al. | |
| 2008/0032588 A1 | 2/2008 | Sun | |
| 2008/0032590 A1 | 2/2008 | Sun | |
| 2008/0242190 A1 | 10/2008 | Hofer et al. | |
| 2009/0191787 A1 | 7/2009 | Rubinstein | |
| 2010/0041303 A1 | 2/2010 | Koonce, Jr. et al. | |
| 2010/0142209 A1 | 6/2010 | Cuppett et al. | |

FOREIGN PATENT DOCUMENTS

| | | |
|---|---|---|
| JP | 2006201307 | 8/2006 |
| KR | 1020080085546 | 9/2008 |
| KR | 2020090002085 | 3/2009 |

\* cited by examiner

LIGHT DIRECTING EXPANDABLE ENVELOPE

BACKGROUND

The present disclosure relates to a light directing expandable envelope. In one embodiment, the present disclosure relates to a light directing expandable envelope that includes a light source, a light directing film, and an optional reflective film.

Low cost, portable light are highly useful for a variety of applications. For example, as an emergency light when electricity is limited or unavailable. A portable light would have use as exterior lighting for events, parties, camping, or other activities during darkness when overhead lighting is needed but where permanent overhead lights are impractical or simply unavailable. Portable lights would also have applications for indoor use as an alternative to floor, desk, or permanent ceiling or wall lighting where portability or architectural design is an important element.

Balloons have been created that include a light source. However, the light source is often included to provide a decorative aspect to the balloon. For example, US Pat. App. publication 2008/0242190 discloses an LED-projection message on a balloon wherein light emitting elements are projected via a lens assembly into a balloon. U.S. Pat. No. 5,117,344 discloses an illuminated balloon assembly that includes an electric lamp and various films sealed together to effectively illuminate the design provided on the film.

Such light sources and balloon designs are effective at achieving the design aspects. However, the light source in connection with the balloon is not designed to maximize the light output in a specific area surrounding the balloon.

SUMMARY

Disclosed is an expandable envelope that comprises a light directing film this both transmits and reflects light. In its expanded form and along with a light source, the envelope forms a light balloon that due to the light directing film provides directed light to an area surrounding the balloon. As used herein, "light directing film" is a film that both transmits and reflects light. In one embodiment, the light directing film transmits at least 20% and reflects at least 20% of a lambertian light. In one embodiment, the light directing film is a structured surface. In one embodiment, the light directing film is a multilayered, reflective polarizer. In one embodiment, the expandable envelope further comprises a reflective film. The resulting light is uniform and high quality.

In one embodiment, an expandable envelope comprises a film that forms an external surface of the envelope and a light source for introducing light in to the envelope. At least a portion of the film is a light directing film that transmits at least 20% and reflects at least 20% of a lambertian light and at least a portion of the film is a reflective film.

In one embodiment, an expandable envelope comprises a film that forms an external surface of the envelope and a light source for introducing light in to the envelope. At least a portion of the film is a light directing film that is a structured surface and at least a portion of the film is a reflective film.

In one embodiment, an expandable envelope comprises a film that forms an external surface of the envelope and a light source for introducing light in to the envelope. At least a portion of the film is a light directing film that is a multi-layer reflective polarizer and at least a portion of the film is a reflective film.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Figure 1:
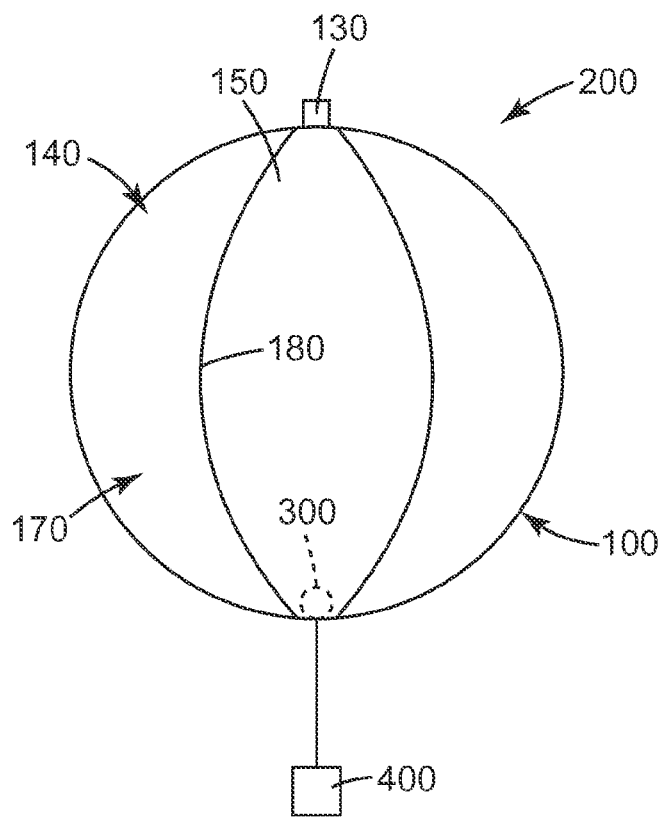
FIG. 1 is a perspective view of a first embodiment of a light balloon.
Figure 2:
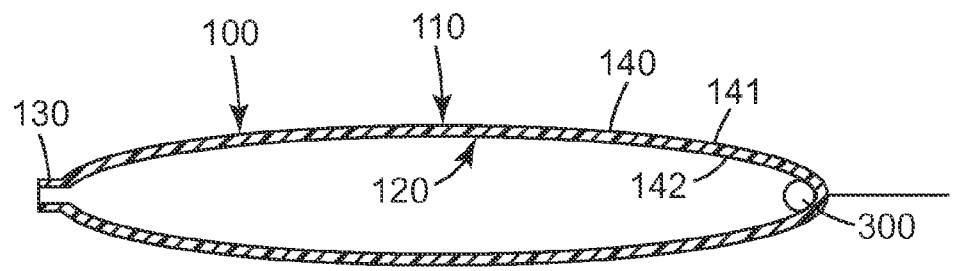
FIG. 2 is a side view of an embodiment of envelope.

The present disclosure relates to an expandable envelope 100. When the envelope 100 is filled with a medium 170 and a light source 300 is applied, the envelope 100 forms a light balloon 200. FIGS. 1, 3, 4, and 5 show various embodiments of a light balloon 200. FIG. 2 shows an embodiment of an envelope 100 without a medium 170 inside the envelope and therefore unexpanded.

The envelope 100 is formed of a film 140. A first side 141 of the film 140 forms an external surface 110 of the envelope 100. A second side 142 of the film 140 forms an internal surface 120 of the envelope.

The film 140 that forms the envelope 100 is comprised of a light directing film 150 that both transmits and reflects light. As used herein, "light directing film" is a film that transmits and reflects light. In one embodiment, the light directing film transmits at least 20% and reflects at least 20% of a lambertian light. In one embodiment, the light directing film transmits at least 25% and reflects at least 25% of a lambertian light. In one embodiment, the light directing film transmits at least 30% and reflects at least 30% of a lambertian light.

Figure 6:
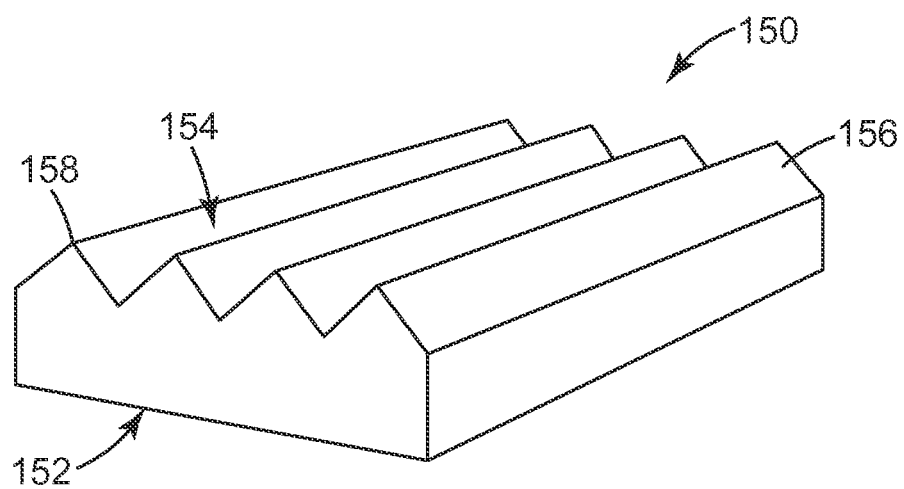
FIG. 6 is an enlarged side view of an embodiment of a light directing film.

FIG. 6 is a representative example of a light directing film 150 in accordance with the prior art. Films similar to light directing film 150 have been previously disclosed, for example, in U.S. Pat. Nos. 4,906,070 and 5,056,892, which are herein incorporated by reference. Light directing film 150 includes smooth surface 152, structured surface 154, and prism elements 156 with peaks 158. Smooth surface 152 and structured surface 154 are on opposing sides of light directing film 150. Prism elements 156 are linearly arranged to form structured surface 154. Peak 158 is formed at the top of each prism element 156. As shown in FIG. 6, peak 158 is a sharp tip.

In operation, light that is incident on smooth surface 152 at relatively high incidence angles is refracted at smooth surface 152 and structured surface 154 and is redirected such that it is substantially on-axis, or substantially perpendicular, to smooth surface 152. Light incident on structured surface 154 at angles that are greater than the critical angle undergoes total internal reflection from both sides of prism element 156 and is redirected back through smooth surface 152 where it is recycled by a reflective surface below smooth surface 152.

The combination of refraction and total internal reflection increases the amount of on-axis light and decreases the amount of off-axis light.

The light directing film 150 may be a reflective polarizer. A reflective polarizer substantially reflects light of a first polarization and substantially transmits light of another polarization. In some cases, the reflective polarizer can include a multilayer optical film wherein at least some of the layers are birefringent. In some cases, the reflective polarizer can include alternating layers, where at least one of the alternating layers includes a birefringent material. In some cases, the reflective polarizer can include a wire grid reflective polarizer, or a cholesteric reflective polarizer. In some cases, the reflective polarizer can be or include a fiber polarizer. In such cases, the reflective polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, which are herein incorporated by reference.

In some cases, the reflective polarizer can be a diffuse reflective polarizer substantially transmitting one polarization state and substantially diffusely reflecting an orthogonal polarization state. Diffuse reflective polarizer films typically include a disperse phase of polymeric particles disposed within a continuous birefringent matrix. The film is oriented, typically by stretching, in one or more directions to develop the birefrengence. Examples of diffuse reflective polarizers are described in, for example, U.S. Pat. Nos. 6,999,233 and 6,987,612, which are herein incorporated by reference.

A light source 300 introduces light into the envelope 100. A light source 300 may be provided internal to or external to the envelope 100. It is understood that one or more light sources 300 may be provided. As discussed above, use of a light directing film 150 causes a portion of the light within the envelope 100 that contacts the light directing film 150 to be reflected back within the envelope 100, while a portion is transmitted through the light directing film 150 in an oriented direction across the entire surface area of the light directing film. For example, in one embodiment, as shown by the arrows in FIGS. 3 and 4, the light passes out from the light directing film normal to the surface of the light directing film. Because of the reflection of some of the light at the light directing film 150, light from a light source 300 can be more uniformly displayed outward from the envelope 100 through the light directing film 150. Use of the light directing film 150 therefore allows for a very low-power light source, such as an LED, to be used while achieving uniform light transmittance over the entire surface area of the light directing film 150.

It is desirable to maximize the amount of light from the light source 300 that enters the envelope 100. Therefore, the light source 300 may be located within the envelope. Alternatively, the light source 300 may be located on an external surface 110 of the envelope 100. To maximize the amount of light from the light source 300 that enters the envelope 100, the light source 300 could be placed adjacent a clear portion of film, instead of the light directing film 150.

An advantage of using a light directing film 150 with the envelope 100 is that the envelope will serve as a mixing chamber for the reflected light and resulting in the transmitted light being oriented in a direction across the entire surface area of the light directing film. Therefore, the light source can be located anywhere at the envelope to introduce light within the envelope while still obtaining uniform transmission out of the envelope 100 of light across the light directing film 150. Therefore, the different embodiments, FIGS. 1-5, show different locations of the light source 300.

The light source 300 includes a power source 400 that my be direct current or alternating current from a fixed or remote source. The connection to a fixed power source, such as shown in FIG. 1, may provide a tether for controlling the location of the expanded and inflated light balloon 200. Remote sources of power, such as a battery, provide for an expanded and inflated light balloon 200 to be used in a variety of locations where access to a fixed power source is limited or unavailable.

A single or multiple light sources may be included on a single power source. A plurality of light sources can be included on a plurality of power sources. It may be desirable to provide multiple light sources to minimize the amount of heat produced by the light source. For example, providing a single, relatively high-powered light source can produce a relatively large amount of heat that may adversely impact the design and functionality of the expanded light balloon, necessitating a heat sink.

The envelope 100 holds a medium 170, which is a material that is held within the envelope to cause the envelope 100 to be expanded and inflated. In one embodiment, the medium 170 is a fluid, such as a gas or a liquid. In one embodiment, the medium 170 is a lighter-than-air gas to allow the balloon to float or be suspended in air. The envelope 100 may be formed to include a medium 170 within the envelope 100 that inflates and expands the envelope 100. In another embodiment, the envelope 100 may be deflated and the medium 170 is later introduced to the envelope 100 to expand and inflate the envelope 100. The medium 170 may be introduced by the user by a variety of known techniques depending on the medium 170. For example, the medium 170 may be pumped into the envelope 100 or the medium 170 may be included in preloaded, pressurized vessels that introduce the medium 170 into the envelope 100 upon activation.

The envelope 100 may contain a bladder 210 held within the envelope 100 that holds and contains the medium 170 such that expansion of the bladder 210 produces expansion of the envelope 100. Therefore, the envelope 100 may be construction to not include tight seals to hold in the medium 170 and instead the bladder 210 is designed to hold the medium 170. It is understood that if a bladder 210 is included that it should be constructed of a material that does not substantially interfere with the internal transmission of light within the envelope 100.

The inflatable and expandable envelope 100 may include an access 130 that is an entry point for introducing a medium 170 into the envelope 100 or into the bladder 210, if included. The access 130 may be any kind of opening that can be positioned to be closed to keep the medium 170 within the envelope 100. For example, the access 130 may be a valve or more specifically a check valve.

FIG. 1 shows an embodiment of an envelope 100 that is expanded and inflated with a light source 300 to form a light balloon 200. In this embodiment, the light balloon 200 is entirely formed of light directing film 150. A single light source 300 is included and is powered through a AC/DC power converter or other power source. The light balloon 200 in FIG. 2 is inflated with a lighter-than-air medium 170 such that the light balloon 200 floats in air but is tethered by the power source connection 400. Access 130 in the form of a check valve is included.

In this embodiment, the light directing film 150 is formed into wedge shapes that are thicker in a center and are thinner at the ends. Adjacent portions of the light directing film 150 wedges are connected to one another as seal 180 resulting in a generally spherical light balloon 200.

The film 140 forming the envelope 100 may further comprise a reflective film 160. The embodiments of the light balloon 200 shown in FIGS. 3, 4, and 5 include a reflective film 160. The reflective film 160 is at least reflective at the internal surface 120 of the envelope 100. Therefore, the light from the light source 300 is reflected from the reflective film 160 and transmitted from the light balloon 200 through light directing film 150. Including a reflective film 160 increases the amount and intensity of light transmitted through the light directing film 150 as compared to embodiments that do not include a reflective film 160.

The reflective film can have a reflectivity that includes a specular reflectivity component, a diffuse reflectivity component or both. In some exemplary embodiments, the reflective film is a specular reflector. Examples of suitable reflective layers include, without limitation, metallic reflective layers, such as silver-coated or aluminum-coated mirrors or mirror films, polymeric reflective layers, such as multilayer polymeric reflective films, multilayer inorganic films, specular reflectors coated with diffuse coatings, particle-loaded polymeric films, particle-loaded voided polymeric films and back-scattering reflectors.

Figure 3:
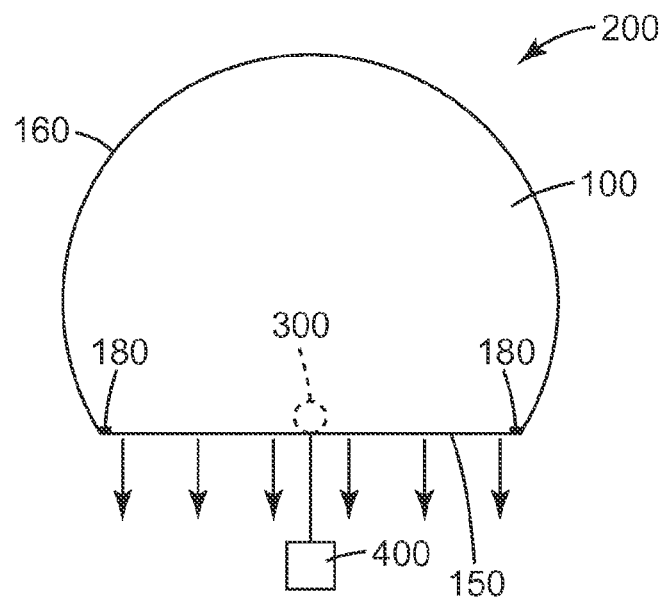
FIG. 3 is a perspective view of a second embodiment of a light balloon.
Figure 4:
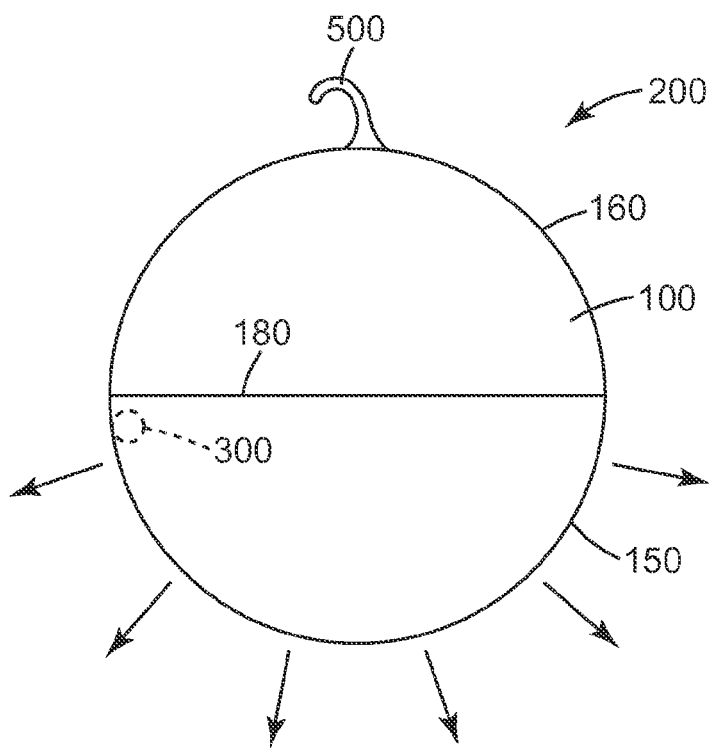
FIG. 4 is a perspective view of a third embodiment of a light balloon.
Figure 5:
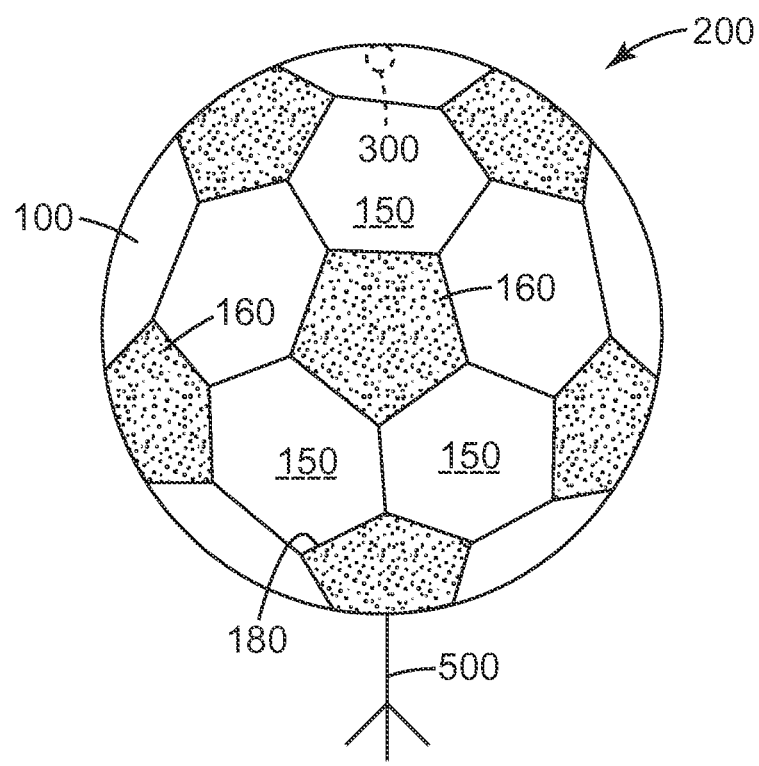
FIG. 5 is a perspective view of a fourth embodiment of a light balloon.

FIGS. 3-5 show embodiments of an envelope 100 that is expanded and inflated to form a light balloons 200. In these embodiments, the envelope 100 comprises both a light directing film 150 and a reflective film 160.

In FIG. 3 the light balloon 200 includes a reflective film 160 that is somewhat spherical shape with the light directing film 150 generally in a flat plane. The light source 300 is shown at the center of the light directing film 150 and is powered by a wire to power source. The light enters the light balloon 200 from the power source. The light reflects from the reflective film 160. A portion of the light is reflected from the light directing film 150 and a portion is transmitted from the light directing film 150. The light directing film transmits the light out of the envelope in a generally down ward direction, as indicated by the arrows.

Therefore, through use of a single light source 300, the reflective film 160 and light directing film 150, the light emitted from the balloon 200 is uniformly transmitted over the surface area of the light directing film 150 and is transmitted in a uniform direction, generally downward.

FIG. 4 shows a light balloon 200 similar to FIG. 3, but the light directing film 150 is also in a generally spherical shape such that the overall shape of the light balloon 200 is spherical. In this embodiment, the spherical shape of the light directing film 150 provides for emitted light to extend downward and to the sides outward from the balloon.

FIG. 5 shows a light balloon 200 similar to FIGS. 3 and 4, but individual portions of the light directing film 150 and reflective film 160 are maintained in a generally flat plane. Each individual flat plane portion is in a multi-sided polygon, in this case a hexagon, and the edges of each hexagon are sealed 180 to one another and to form an overall spherical shaped light balloon 200. Such a construction is similar in configuration to a soccer ball. As with the other embodiments, light within the envelope 100 is reflected from the reflective film 160 and transmitted outward through the light directing film 150.

The light balloon 200, in its expanded and inflated form, may be provided in a variety of shapes. For example, the light balloon 200 may be spherical, pyramidal, or cubical, or maybe in a three-dimensional shape of a heart, star, circle, square, rectangle, cone, or cylinder with smooth curving surfaces or planar surfaces. The light balloon 200 may have portions that are curving surfaces and a portion with flat planar surface, such as shown in FIG. 3 or may be comprised of a plurality of flat planar surface that overall form a spherical shape, such as shown in FIG. 5. The film 140 forming the light balloon 200 may be elastic to stretch into an expanded shape. The film 140 may be precut in various shapes and configurations to arrive at an expanded three dimensional shape. The film 140 may be pleated to allow for expansion upon introduction of the medium 170.

Manipulation of the surface area and shape of the light directing film 150 results in manipulation of the emitted light from the light balloon. Therefore, the size, location and configuration of the light directing film 150 is designed to meet the desired direction and intensity of the outwardly emitted light. For example, in the embodiment shown in FIG. 3, a majority of the surface area of the envelope 100 is reflective film 160 and the light directing film 150 is in a flat plane. Therefore, the intensity of light emitted through the light directing film 150 will be relatively large as compared to a design for example as shown in FIG. 1 where essentially all of the envelope is light directing film. Also, the light emitted through the light directing film 150 in FIG. 3 is generally downward because the light directing film 150 is in a single flat plane. Distinguishable from the embodiment shown in FIG. 3 is FIG. 4 where a larger portion of the total surface area of the light balloon 200 is light directing film 150 and where the light directing film 150 is in a curved plane. Therefore, the light emitted through the light directing film 150 in FIG. 4 is downward and to the sides.

The film 140 that forms the envelope may be curved, planar, highly elastic or inelastic. In elastic is defined as having a relatively small amount of elastic strain, less than 5%. Elastic films when expanded will typically provide a curved surface. Inelastic films can be provided in a flat plane configuration or can be curved to provide a curved configuration. Inelastic films can be molded or thermal formed to form curved films. It is understood that portions of the envelope 100 may be formed from an elastic film while other portions may be inelastic. Typically, the light directing film 150 is inelastic. However, the optional reflective film or optional additional films may be inelastic or elastic. The light directing film 150 although inelastic could be molded in a curved shape to arrive at a curved configuration of the light balloon such as shown in FIG. 4.

All or a portion of the envelope 100 is formed of light directing film 150. Typically, the light directing film 150 comprises at least 10% of the total surface area of the envelope 100. In one embodiment the light directing film 150 comprises at least 25% of the total surface area of the envelope 100 and in one embodiment the light directing film 150 comprises at least 50% of the total surface areas of the envelope 100.

Optionally, the reflective film 160 is provided to give the added advantage of maximizing the outwardly transmitted light through the light directing film 150. The light directing film 150 may comprise at least 10% of the total surface area of the envelope 100, in some embodiments at least 25% of the total surface area of the envelope 100, and in some embodiments at least 50% of the total surface area of the envelope 100.

Optionally, additional films may be included in the construction of the envelope 100. Such films may be opaque, transparent, colored, decorative, elastic or inelastic.

As discussed the film 140 that forms the envelope 100 may be provided so as to be air tight or simply able to be inflated and expanded by an inner contained bladder that itself is able to hold the medium 170. Therefore, a variety of techniques may be used to seal together the various films.

In one embodiment, the light balloon 200 may be suspended by a mechanical support 500. For example, in the embodiment shown in FIG. 4, the light balloon 200 includes a hook for securing the light balloon 200. A mechanical support may be a variety of other fixtures like hooks, fasteners, posts that secure or suspend the light balloon.

In another embodiment, the light balloon 200 is buoyant in air. The buoyancy can be achieved by using a light-than-air gas to fill the envelope, heat such as from the light source, a mechanical propeller, or a combination of these techniques to achieve buoyancy. Regardless, the size of the envelope 100 and the buoyancy technique may need to be adjusted to arrive at a light balloon 200 that is able to suspend in air provided the overall weight of the light balloon 200.

The envelope 100 without the medium 170 can be collapsible to a very small size to provide highly portable device. The portability is enhanced if a battery powered light source is included with the envelope. Introduction of the medium 170 expands the envelope 100 and providing a light source 300 forms a light balloon 200 with light emitting through the light directing film 150.

The highly portable envelope 100 allows for the light balloon 200 to be used for example in settings where availability to power is limited but light is needed such as for outdoor lighting needs, emergency road-side assistance light, or emergency light beacons. The light balloon 200 can also be a simple, low-cost alternative to a table or desk lamp where directed light is needed.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. An expandable envelope comprising a film that forms an external surface of the envelope, wherein at least a portion of the film is a structured light directing film having an outer structured surface defining the external surface and an inner smooth surface opposite the outer structured surface, and further wherein the expandable envelope is configured such that light at an interior of the expandable envelope is uniformly emitted from the expandable envelope on-axis to the inner smooth surface over a surface area of the structured light directing film; wherein at least a portion of the film is a reflective film; wherein a reflective portion of the reflective film is at an internal surface of the envelope; wherein the light directing film is located opposite to the reflective film such that upon inflation of the envelope, the light directing film is separated from the reflective film, and further wherein the reflective film is curved upon inflation of the envelope, and further wherein an entirety of the light directing film is inelastic and is in a single flat plane upon inflation of the envelope and all light emitted from the envelope is uniformly transmitted over the surface of the light directing film in a uniform direction.

2. The envelope of claim 1, wherein the structured light directing film uniformly transmits at least 20% and reflects at least 20% of a lambertian light over the surface area of the structured light directing film.

3. The envelope of claim 1, wherein the outer structured surface of the structured light directing film comprises a plurality of linear structures extending along a same direction.

4. The envelope of claim 3, wherein the linear structures are prismatic.

5. The envelope of claim 1, wherein the light directing film comprises a reflective polarizer that reflects light of a first polarization and transmits light of another polarization.

6. The envelope of claim 5, wherein the reflective polarizer is multilayered.

7. The envelope of claim 1, wherein the light directing film is in a flat plane at the external surface of the envelope.

8. The envelope of claim 1, wherein the external surface of the envelope comprises a plurality of flat plane sections of the light directing film.

9. The envelope of claim 1, wherein at least a portion of the light directing film is in a curved plane at the external surface of the envelope.

10. The envelope of claim 1, wherein the envelope is airtight.

11. The envelope of claim 1, further comprising a valve for introducing a medium within the envelope to expand the envelope.

12. The envelope of claim 1, further comprising a bladder within the envelope that is airtight for expanding the envelope.

13. The envelope of claim 1, wherein at least 25% of the surface area of the envelope is the reflective film.

14. The envelope of claim 1, wherein at least 25% of the surface area of the envelope is the light directing film.

15. The envelope of claim 1, further comprising a light source.

16. An expandable envelope comprising: a film that forms an external surface of the envelope, wherein at least a portion of the film is a structured light directing film that transmits at least 20% and reflects at least 20% of a lambertian light, the structured light directing film including a smooth surface and a structured surface, the structured surface arranged at the external surface of the envelope, and at least a portion of the film is a reflective film; and a light source for introducing light into the envelope; wherein light from the light source is uniformly transmitted from the envelope over a surface area of the structured light directing film, including a portion of light from the light source that is incident the smooth surface at a high incident angle being refracted at the smooth surface and the structured surface and is redirected such that it exits the envelope perpendicular to the smooth surface, and a portion of light on the structured surface undergoes total internal reflection and is redirected back through the smooth surface and is subsequently reflected at the reflected film back toward the structured light directing film wherein at least a portion of the film is a reflective film; wherein a reflective portion of the reflective film is at an internal surface of the envelope; wherein the light directing film is located opposite to the reflective film such that upon inflation of the envelope, the light directing film is separated from the reflective film, and further wherein the reflective film is curved upon inflation of the envelope, and further wherein an entirety of the light directing film is inelastic and is in a single flat plane upon inflation of the envelope and all light emitted from the envelope is uniformly transmitted over the surface of the light directing film in a uniform direction.

* * * * *

UNITED STATES PATENT AND TRADEMARK OFFICE
CERTIFICATE OF CORRECTION

| | | |
|---|---|---|
| PATENT NO. | : 8,789,981 B2 | Page 1 of 1 |
| APPLICATION NO. | : 12/895941 | |
| DATED | : July 29, 2014 | |
| INVENTOR(S) | : Michael Harms | |

It is certified that error appears in the above-identified patent and that said Letters Patent is hereby corrected as shown below:

In the Specification

Column 6
Line 30, delete "In elastic" and insert -- Inelastic --

Signed and Sealed this
Ninth Day of December, 2014

Michelle K. Lee
*Deputy Director of the United States Patent and Trademark Office*